(12) United States Patent
Xu et al.

(10) Patent No.: US 11,097,561 B2
(45) Date of Patent: Aug. 24, 2021

(54) AUTOMATIC HUB TYPE IDENTIFYING DEVICE

(71) Applicant: CITIC Dicastal CO., LTD., Hebei (CN)

(72) Inventors: Zuo Xu, Qinhuangdao (CN); Guoyuan Xiong, Qinhuangdao (CN); Jinqi Lv, Qinhuangdao (CN); Zhipeng Li, Qinhuangdao (CN); Zhigao Yin, Qinhuangdao (CN); Chunhai Liu, Qinhuangdao (CN); Debin Tang, Qinhuangdao (CN); Yongning Wang, Qinhuangdao (CN); Zhihua Zhu, Qinhuangdao (CN); Guogang Chen, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 203 days.

(21) Appl. No.: 16/217,278

(22) Filed: Dec. 12, 2018

(65) Prior Publication Data
US 2019/0291480 A1   Sep. 26, 2019

(30) Foreign Application Priority Data

Mar. 23, 2018 (CN) .......................... 201810243332.0

(51) Int. Cl.
*G01G 19/414* (2006.01)
*G06Q 10/08* (2012.01)
(Continued)

(52) U.S. Cl.
CPC .......... *B41J 13/103* (2013.01); *B65H 3/0669* (2013.01); *B65H 7/06* (2013.01);
(Continued)

(58) Field of Classification Search
CPC ........ B41J 13/103; B65H 3/0669; B65H 7/06; G01G 19/414; G01G 19/4144;
(Continued)

(56) References Cited

U.S. PATENT DOCUMENTS 3,220,527 A * 11/1965 Curtis .................. B65G 41/002
                                                        193/35 R
3,878,909 A *  4/1975 Treiber .................. B65C 1/021
                                                          177/145
(Continued)

*Primary Examiner* — Randy W Gibson
(74) *Attorney, Agent, or Firm* — Cooper Legal Group, LLC

(57) ABSTRACT

An automatic hub type identifying device and a method for identifying a hub type using the device are provided. The device includes a feed roller bed, an electronic belt scale, a transfer roller bed, an identification device, a discharge roller bed and a processor, in which the feed roller bed is configured to convey a hub to the electronic belt scale; the electronic belt scale is in data connection with the processor, and is configured to weigh the hub conveyed by the feed roller bed and transmit the weighing result to the processor; the transfer roller bed is configured to transfer the hub from the electronic belt scale to the identification device; and the identification device includes servo drive devices and micro contact displacement detecting devices connected to the servo drive devices.

3 Claims, 1 Drawing Sheet

(51) Int. Cl.
*B41J 13/10* (2006.01)
*B65H 7/06* (2006.01)
*B65H 3/06* (2006.01)

(52) U.S. Cl.
CPC ....... *G01G 19/4144* (2013.01); *G01G 19/414* (2013.01); *G06Q 10/08* (2013.01)

(58) Field of Classification Search
CPC .. G01G 19/005; G07G 1/0072; G07G 1/0054; A47F 9/047; A47F 9/048; G06Q 10/08
See application file for complete search history.

(56) References Cited

U.S. PATENT DOCUMENTS

| | | | | |
|---|---|---|---|---|
| 4,676,343 A * | 6/1987 | Humble | ............... | A47F 9/047 177/50 |
| 4,696,357 A * | 9/1987 | Beehler | ............... | G01G 13/295 177/145 |
| 5,276,945 A * | 1/1994 | Matsumura | ............ | A47K 13/10 16/337 |
| 5,331,118 A * | 7/1994 | Jensen | ................... | G01B 11/00 177/245 |
| 5,850,370 A * | 12/1998 | Stringer | ................. | G01B 11/00 367/128 |
| 5,909,013 A * | 6/1999 | Dlugos | ................ | G01G 19/005 177/25.11 |
| 5,944,169 A * | 8/1999 | Allen | ..................... | B65G 13/10 186/59 |
| 5,987,428 A * | 11/1999 | Walter | ............... | G01G 19/4144 177/25.15 |
| 6,102,185 A * | 8/2000 | Neuwirth | ............... | B65G 13/11 193/35 R |
| 7,159,477 B2 * | 1/2007 | Edwin | ..................... | G01B 5/08 33/501.08 |
| 7,321,859 B2 * | 1/2008 | Cooper | ................. | G01B 11/04 702/159 |
| 9,146,146 B2 * | 9/2015 | Laird | ..................... | G01G 19/00 |
| 9,301,626 B2 * | 4/2016 | Tornwall | ................ | G01N 21/84 |
| 10,617,237 B2 * | 4/2020 | Pan | ........................ | A47F 9/048 |

* cited by examiner

AUTOMATIC HUB TYPE IDENTIFYING DEVICE

CROSS-REFERENCE TO RELATED APPLICATIONS

The present application claims benefit of Chinese Patent Application No. 201810243332.0, filed on Mar. 23, 2018, the contents of which are hereby incorporated by reference in its entirety.

BACKGROUND

There are many types of hubs. In order to ensure automatic production of the hub production, processing and packaging process, it is necessary to accurately identify the hub types to avoid mis-processing, mis-detection and mis-packaging. Therefore, it is necessary to use an automatic hub type identifying device instead of manual operation. The existing hub identification is only limited to front window photos of hubs, so the identification error of the same type of hubs often occurs.

The automatic hub type identifying device can accurately confirm the same type of hubs by on-line dimensional measurement and weighing to avoid misidentification.

SUMMARY

The present disclosure relates to the field of industrial control technology, and specifically, relates to an automatic hub type identifying device and method.

The object of the present disclosure is to provide an automatic hub type identifying device capable of meeting the requirement for automatic identification of different hub types.

In order to achieve the above object, the present disclosure provides the following technical solution:

In one aspect of the present disclosure, provided is An automatic hub type identifying device, comprising a feed roller bed, an electronic belt scale, a transfer roller bed, an identification device, a discharge roller bed and a processor, the feed roller bed is configured to convey a hub to the electronic belt scale; the electronic belt scale is in data connection with the processor, and is configured to weigh the hub conveyed by the feed roller bed and transmit the weighing result to the processor; the transfer roller bed is configured to transfer the hub from the electronic belt scale to the identification device; the identification device includes servo drive devices and contact position sensors connected to the servo drive devices, and the contact position sensors are in data connection with the processor; the servo drive devices are configured to drive the contact position sensors to contact the inner and outer edges of the hub when the hub reaches the identification device; the contact position sensors transmit the measured position information to the processor after contacting the inner and outer edges of the hub; the discharge roller bed is configured to carry the hub away from the identification device; the processor is configured to compare the weighing result of the electronic belt scale with a preset hub type-weighing result to obtain a possible range of the hub type; and the processor is also configured to calculate the dimension of the hub based on the measured position information of the contact position sensors, and compare the dimension with the preset hub type—weighing result to obtain a possible range of the hub type.

In a preferred aspect of the disclosure, the contact position sensors are micro contact displacement detecting sensors.

In a preferred aspect of the disclosure, the servo drive devices and the contact position sensors are located at the upper side edge of the hub, the lower side edge of the hub, the center of the back cavity of the hub, the front edge of the wheel disc and the end of the rim.

In a preferred aspect of the disclosure, the servo drive devices and the contact position sensors are configured to measure coordinates of 4-6 feature points on the hub, and the feature points are selected from one or more points at the front side edge of the wheel disc, one or more points on humps of the outer rim, one or more points on the bead seat, one or more points on the inner rim, and one or more points on the front cap slot of the wheel disc.

In another aspect of the present disclosure, provided is a method for identifying a hub type using the method described above, the method comprising the steps of: (1) conveying a hub to be identified to an electronic belt scale by a feed roller bed; (2) by using the electronic belt scale, weighing the hub on the electronic belt scale conveyed by the feed roller bed, and transmitting the weighing result to the processor; (3) transferring the hub from the electronic belt scale to an identification device by a transfer roller bed; (4) driving, by servo drive devices, contact position sensors to contact the inner and outer edges of the hub, and transmitting, by the contact position sensors, measurement position information to a processor after contacting the inner and outer edges of the hub; (5) carrying the hub away from the identification device by a discharge roller bed; (6) comparing, by the processor, the weighing result of the electronic belt scale with a preset hub type-weighing result to obtain a possible range of the hub type; (7) calculating the dimension of the hub based on the measurement position information of the contact position sensors, and comparing the dimension with the preset hub type—weighing result to obtain a possible range of the hub type by the processor; and (8) combining, by the processor, the possible ranges of the hub type in steps 6 and 7 to obtain a determination result of the hub type.

The technical solution of the present disclosure has the following advantages:

(1) The device adopts the electronic belt scale as a detecting element for the hub identification, which can realize rough hub identification and positioning confirmation on the presence or absence of a hub.

(2) The device is accurate and reliable in dimensional measurement positioning by adopting the micro contact measuring sensors.

(3) The device is accurate and reliable in positioning by adopting servo drive, and can automatically detect the displacement by adopting the displacement sensors.

(4) The device can accurately identify the bead seat of the hub by adopting industrial cameras, thereby measuring the diameter of the bead seat of the hub.

(5) The device can accurately measure the diameter of the bead seat of the hub and the width of the hub by adopting the displacement measuring sensors.

(6) By using program control and an algorithm, the device can obtain the offset value of the hub through a combination of the above components, thereby providing three key dimensional data as identification criteria for the confusing hub type, and achieving the effect of 100% accurate identification on the hub.

BRIEF DESCRIPTION OF DRAWINGS

The embodiments of the present disclosure will be described in detail below in combination with the accompanying drawings, in which.

LIST OF REFERENCE SYMBOLS

Figure 1:
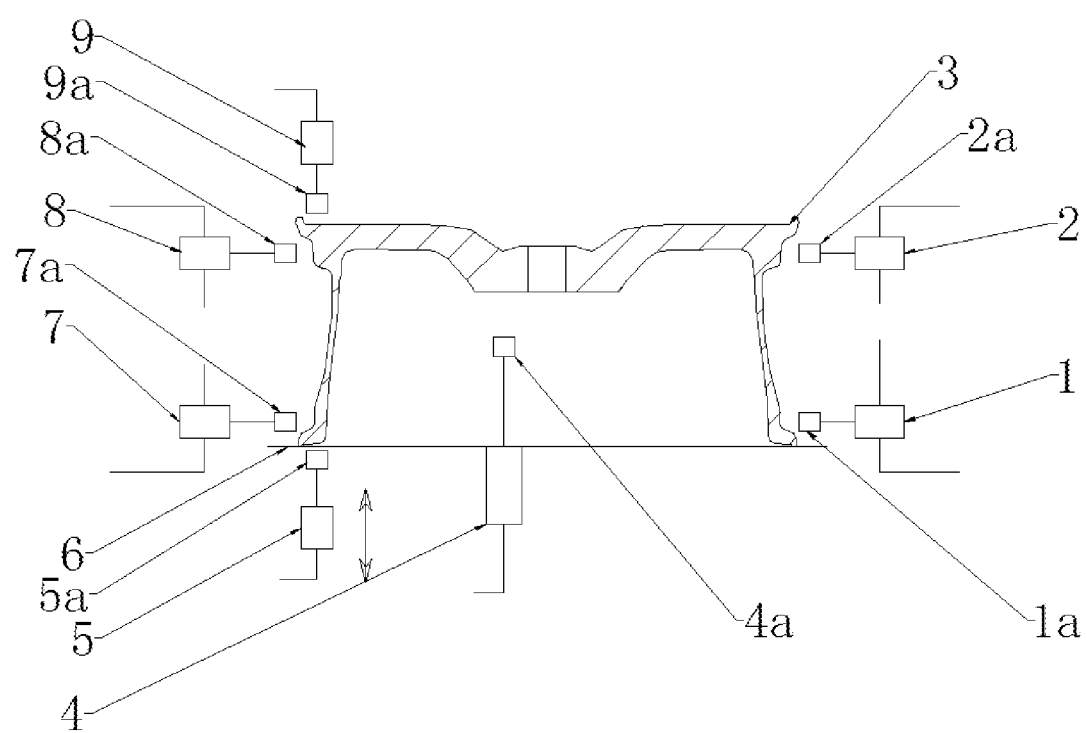
FIG. 1 is a structure schematic diagram of the automatic hub type identifying device during dimensional detection.

1—first servo drive device, 2—second servo drive device, 3—hub, 4—third servo drive device, 5—fourth servo drive device, 6—roller bed, 7—fifth servo drive device, 8—sixth servo drive device, 9—seventh servo drive device, 1a, 2a, 4a, 5a, 7a, 8a, 9a—contact position sensor.

DETAILED DESCRIPTION

First Embodiment: An Automatic Hub Type Identifying Device

The automatic hub type identifying device will be described in detail below in combination with the accompanying drawings.

The automatic hub type identifying device includes a first servo drive device 1, a second servo drive device 2, a hub 3, a third servo drive device 4, a fourth servo drive device 5, a roller bed 6, a fifth servo drive device 7, a sixth servo drive device 8, a seventh servo drive device 9, contact position sensors 1a to 7a, and an electronic belt scale.

The hub 3 on the roller bed 6 is first weighed by the electronic belt scale of the automatic hub type identifying device, roughly identified and positioned, that is, different hub types are distinguished by weight.

When the roughly identified hub 3 runs to an automatic dimensional measurement station, the hub 3 stops moving, and the servo drive devices 1, 2, 4, 5, 7, 8 and 9 drive the contact position sensors to measure the diameters of inner and outer bead seats of the hub 3, the width of the hub and the distance from the inner rim of the hub 3 to the flange face. The first and fifth servo drive devices 1, 7 and the second and sixth servo drive devices 2, 8 are equipped with industrial cameras for position identification of the bead seat of the hub 3; the first and fifth servo drive devices 1, 7 drive the contact position sensors to measure two points spacing a 180° phase angle on the same circumference as the bead seat of the hub 3, and the measured data is the diameter of the inner bead seat of the hub 3; meanwhile, the contact position sensors on the second and sixth servo drive devices 2, 8 are spaced a 180° phase angle from the same circumference of the outer bead seat of the hub 3 for detection, and the measured data is the diameter of the outer bead seat of the hub 3.

Meanwhile, the fourth and seventh servo drive devices 5, 9 drive the contact position sensors thereon to contact the inner and outer rims of the hub 3, and the width of the hub 3 is calculated through the displacement.

The third servo drive device 4 drives the contact position sensor thereon to contact the inner flange face of the hub 3, the distance from the flange face to the inner edge of the hub 3 can be measured, and the offset value ET of the hub 3 is obtained by calculation.

Thus, the weight of the hub 3, the diameters of the inner and outer bead seats and the offset ET are compared with the data stored in an industrial computer to determine the unique type of the hub.

Second Embodiment: An Automatic Hub Type Identifying Device

As described in first Embodiment, after different types of hubs 3 are preliminarily weighed by the electronic belt scale and identified, the weight of the hub 3 is compared with the data in the database of the industrial computer for rough analysis, then the hub 3 is positioned, the diameter, width and offset ET of the hub 3 are detected, and the unique type of the hub 3 is determined according to the preset criteria.

For example, the weight of the hub 3 is measured to give a weight fluctuation range of ±100 g; the diameter of the hub 3 is measured to allow a variation range of nominal diameter $\phi D \pm 0.01$ mm; the allowable fluctuation range of the width is $W \pm 0.01$ mm; the allowable fluctuation range of the offset ET is $E \pm 0.1$ mm; thus, the weight of the hub and the dimensions D, W, E are sequentially input into a comparison parameter table of the industrial computer according to the parameters of different hub types, and the data obtained by the detection are sequentially compared according to the table lookup method to obtain a corresponding hub type.

In this way, the hubs that are easily confused in weight can also be identified and distinguished according to the dimensional difference to achieve the purpose of hub identification.

By testing and verifying 10,000 different types of hubs, the identification device and method can realize 0 error identification, which fundamentally solves the problem of hub type identification error.

The invention claimed is:

1. An automatic hub type identifying device, comprising a feed roller bed, an electronic belt scale, a transfer roller bed, an identification device, a discharge roller bed and a processor, wherein the feed roller bed is configured to convey a hub to the electronic belt scale; the electronic belt scale is in data connection with the processor, and is configured to weigh the hub conveyed by the feed roller bed and transmit a weighing result to the processor; the transfer roller bed is configured to transfer the hub from the electronic belt scale to the identification device; the identification device comprises a first servo drive device, a second servo drive device, a third servo drive device, a fourth servo drive device, a fifth servo drive device, a sixth servo drive device and a seventh servo drive device, each of these servo drive devices is connected to a contact position sensor, and each contact position sensor is in data connection with the processor; each of the first servo drive device, the second servo drive device, the fifth servo drive device and the sixth servo drive device is equipped with an industrial camera for identification of a position of a bead seat of the hub; the first servo drive device and the fifth servo drive devices are configured to drive the corresponding contact position sensors to measure a diameter of an inner bead seat of the hub; the second servo drive device and the sixth servo drive device are configured to drive the corresponding contact position sensors to measure a diameter of an outer bead seat of the hub; the fourth servo drive device and the seventh servo drive device are configured to drive the corresponding contact position sensors to measure a width of the hub; the hub the third servo drive device is configured to drive the corresponding contact position sensor to measure an offset value of the hub; the discharge roller bed is configured to carry the hub away from the identification device; the processor is configured to compare the weighing result of the electronic belt scale with a preset hub type-weighing result to obtain a possible range of a hub type; and the processor is also configured to compare the diameter of the inner bead seat, the diameter of the outer bead seat, the width of the hub and the offset value of the hub with a preset criteria to determine a unique type of the hub.

2. The automatic hub type identifying device according to claim 1, wherein the first servo drive device, the second servo drive device, the third servo drive device, the fourth servo drive device, the fifth servo drive device, the sixth servo drive device, the seventh servo drive device and the corresponding contact position sensors are respectively located at an upper side edge of the hub, a lower side edge of the hub, a center of a back cavity of the hub, a front edge of a wheel disc and an end of a rim.

3. The automatic hub type identifying device according to claim 1, wherein the first servo drive device, the second servo drive device, the third servo drive device, the fourth servo drive device, the fifth servo drive device, the sixth servo drive device, the seventh servo drive device and the corresponding contact position sensors are configured to measure coordinates of 4-6 feature points on the hub, and the feature points are selected from one or more points at a front side edge of a wheel disc, one or more points on humps of an outer rim, one or more points on the bead seat, one or more points on an inner rim, and one or more points on a front cap slot of the wheel disc.

* * * * *